(12) United States Patent
Nilsson (10) Patent No.: US 11,034,232 B2
(45) Date of Patent: Jun. 15, 2021

(54) VEHICLE DRIVELINE SYSTEM

(71) Applicant: BorgWarner Sweden AB, Landskrona (SE)

(72) Inventor: Kristoffer Nilsson, Lund (SE)

( * ) Notice: Subject to any disclaimer, the term of this patent is extended or adjusted under 35 U.S.C. 154(b) by 0 days.

(21) Appl. No.: 16/092,701

(22) PCT Filed: Apr. 13, 2017

(86) PCT No.: PCT/EP2017/058951
§ 371 (c)(1),
(2) Date: Oct. 10, 2018

(87) PCT Pub. No.: WO2017/178595
PCT Pub. Date: Oct. 19, 2017

(65) Prior Publication Data
US 2019/0168603 A1 Jun. 6, 2019

(30) Foreign Application Priority Data
Apr. 15, 2016 (SE) .................................. 1650507-5

(51) Int. Cl.
*B60K 17/35* (2006.01)
*B60K 6/52* (2007.10)
*B60K 17/356* (2006.01)
*B60K 17/16* (2006.01)
*B60K 23/08* (2006.01)
(Continued)

(52) U.S. Cl.
CPC ................. *B60K 6/52* (2013.01); *B60K 6/48* (2013.01); *B60K 17/16* (2013.01); *B60K 17/165* (2013.01); *B60K 17/35* (2013.01); *B60K 17/356* (2013.01); *B60K 23/08* (2013.01); *B60K 23/0808* (2013.01); *B60K 2001/001* (2013.01); *B60K 2006/4808* (2013.01); *B60Y 2200/92* (2013.01); *B60Y 2300/82* (2013.01)

(58) Field of Classification Search
CPC ...... B60K 17/16; B60K 17/165; B60K 17/35; B60K 17/356; B60K 23/08; B60K 23/0808; B60K 2001/001
See application file for complete search history.

(56) References Cited

U.S. PATENT DOCUMENTS

2015/0224867 A1\* 8/2015 Nett .......................... B60K 1/00
180/65.25
2015/0336453 A1 11/2015 Pinschmidt
(Continued)

FOREIGN PATENT DOCUMENTS

| EP | 2727757 A1 | 5/2014 |
| EP | 2851227 A1 | 3/2015 |
| GB | 2466968 A | 7/2010 |

(Continued)

*Primary Examiner* — Huan Le (57) ABSTRACT

A vehicle driveline system for a vehicle is provided. The system comprises a differential having a differential housing connectable to an engine via a pinion, and two output shafts being connectable with respective wheel axles, and an electrical motor being selectively connected to the differential housing. The differential housing extends into a hollow shaft having a radial protrusion provided with engagement means, such as splines, for connecting with a shifting sleeve, wherein said shifting sleeve is configured to be actuated for connecting the electrical motor to said differential housing.

10 Claims, 5 Drawing Sheets

(51) Int. Cl.
*B60K 6/48* (2007.10)
*B60K 1/00* (2006.01)

(56) References Cited

U.S. PATENT DOCUMENTS

2015/0360556 A1   12/2015  Piazza et al.
2019/0283566 A1*  9/2019  Nilsson .................... B60K 6/48

FOREIGN PATENT DOCUMENTS

| WO | 2010101506 A1 | 9/2010 |
| WO | 2012066035 A1 | 5/2012 |
| WO | 2012082059 A1 | 6/2012 |

* cited by examiner

VEHICLE DRIVELINE SYSTEM

This application claims the benefit of Swedish Application No. 1650507-5 filed Apr. 15, 2016, and PCT Application No. EP/2017/058951 filed Apr. 13, 2017.

TECHNICAL FIELD

The present invention relates to a vehicle driveline system for a vehicle. More particularly, the present invention relates to a vehicle driveline system which may be adapted to selectively connect an electric motor to a differential input.

BACKGROUND

The electrical power system of today's passenger cars is based on 12V. Due to the relatively low voltage proposed solutions for high electrical power utilities, such as electrically powered propulsion units, results in high currents which causes high losses and increased cable dimensions.

During recent years there is a trend of adding a 48V electrical power system to the already existing 12V system. As the electrical power increases new and improved solutions may be applicable, replacing the previous solutions requiring additional high power electronics.

One such example is the hybrid technology, i.e. the technology of adding electric drive to existing internal combustion engine drives, and allowing the vehicle to be driven either electrically, by the internal combustion engine, or both. The present applicant has previously presented several solutions for hybrid drive, e.g. as being described in WO2010/101506 or in WO2012/066035. These systems comprise a high power electrical motor for propulsion purposes, and a smaller electrical motor for torque vectoring purposes. Should 48V be available, it would be possible to develop a vehicle driveline system for a selectively all wheel drive vehicle using only a single electrical motor as well as a differential configured to selectively receive torque from the electrical motor, allowing selectable electric all wheel drive.

SUMMARY

An object of the present invention is to provide a vehicle driveline system overcoming the drawbacks of the prior art systems. Especially, an idea of the present invention is to provide a vehicle driveline system being capable of selectively connect an electrical motor to a differential input in order to obtain either hybrid drive or torque vectoring.

According to a first aspect a vehicle driveline system is provided. The system comprises a differential having a differential housing connectable to an engine via a pinion, and two output shafts being connectable with respective wheel axles, and an electrical motor being selectively connected to the differential housing. The differential housing extends into a hollow shaft having a radial protrusion provided with engagement means, such as splines, for connecting with a shifting sleeve, wherein said shifting sleeve is configured to be actuated for connecting the electrical motor to said differential housing.

The differential housing may comprise an outer gearing configured to mesh with the pinion and an inner gearing being connected with the output shafts, wherein the shifting sleeve is configured to be actuated for connecting the inner gearing to said outer gearing.

In an embodiment, the inner gearing forms the hollow shaft having the radial protrusion.

The shifting sleeve may be configured to be positioned in any one of the following modes: i) a first mode in which the shifting sleeve connects the electrical motor to the inner gearing of the differential housing, ii) a second mode in which the shifting sleeve is disconnected from the electrical motor and the inner gearing of the differential housing, iii) a third mode in which the shifting sleeve connects the outer gearing of the differential housing to the electrical motor while disconnecting the inner gearing of the differential housing, and iv) a fourth mode in which the shifting sleeve connects the outer gearing of the differential housing to the electrical motor and to the inner gearing of the differential housing.

In an embodiment, the electrical motor is selectively connected to the differential housing via a reduction gearing.

The reduction gearing may comprise a gear train having a last gear being arranged coaxially around the hollow shaft of the differential housing, said last gear having means for connecting with the shifting sleeve.

In an embodiment, the electrical motor is arranged radially outside said hollow shaft.

The electrical motor may be connectable to the differential housing via a planetary gearing. Further, the planetary gearing may have a first output shaft being connected to the differential housing, and a second output shaft being connected to one of the output shafts of the differential.

The output shafts of the planetary gearing may be formed by a respective planet carrier, wherein the planet carriers are meshing with a common ring wheel.

In an embodiment, the differential housing further comprises a disconnect clutch configured to selectively connect an outer gearing of the differential housing to an inner gearing of the differential housing.

The vehicle driveline system may further comprise a disc coupling being arranged on the input side of the pinion for transferring driving torque to said pinion.

BRIEF DESCRIPTION OF DRAWINGS

The invention will be described in further detail under reference to the accompanying drawings in which.

DETAILED DESCRIPTION

Figure 1:
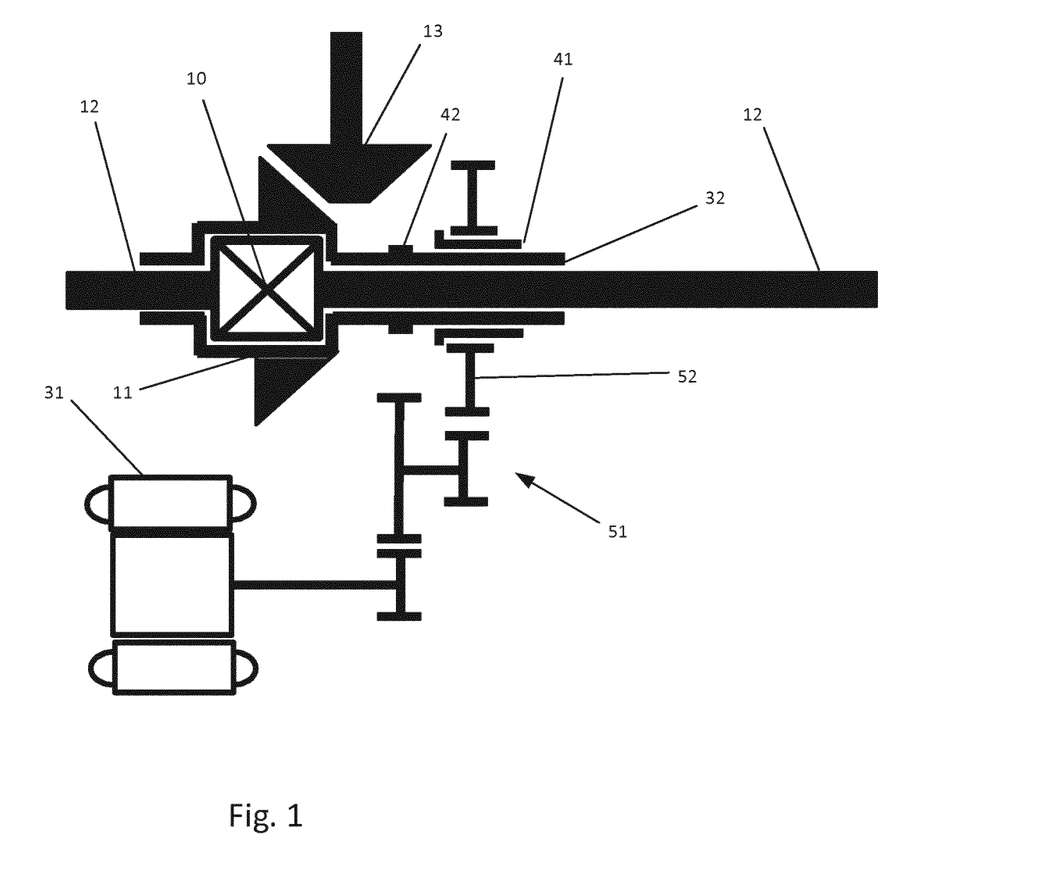
FIG. 1 is a schematic cross-sectional view of a vehicle driveline system according to an embodiment.

In FIG. 1 a vehicle driveline system intended for a vehicle is shown. The vehicle driveline system is configured to be used on either the front or rear axle of the vehicle in order to allow for selectively hybrid drive or torque vectoring of the associated axle. The vehicle may thus be a front wheel drive vehicle, a rear wheel drive vehicle, or an all wheel drive vehicle. The system shown in FIG. 1 could e.g. be mounted at a front axle of a front wheel drive vehicle and comprises a differential 10 connected to the engine via a pinion 13. The differential 10 receives input torque from the pinion 13 and it has two output shafts 12 intended for driving the front wheels. The differential 10 has a differential housing 11 adapted to transfer torque to the output shafts 12. As can be seen in FIG. 1 the differential housing 11 extends into a hollow shaft 32, surrounding a part of one of the output shafts 12. The hollow shaft 32 is provided with a radial protrusion 42, positioned axially displaced from the gearings of the differential 10. The radial protrusion 42 may be provided with engagement means, like for example splines intended for connecting the hollow shaft 32 to an electrical motor 31. The connection is achieved through a shifting sleeve 41 which can be actuated to move axially along the hollow shaft 32 in order to connect with the engagement means provided on the radial protrusion 42. During connection between the shifting sleeve 41 and the radial protrusion 42, the electrical motor 31 is connected to the differential housing 11 thus enabling torque transfer from the electrical motor 31 to the differential housing 11 thus achieving electrical drive of the vehicle.

For this purpose the electrical motor 31, being positioned radially offset from the front axle, is connected to a reduction gearing 51 formed by a gear train. The gear train 51 includes a last gear 52 being arranged coaxially with the output shaft 12 of the differential 10, and being connected with the shifting sleeve 41 via e.g. splines or similar. Hence, when the electrical motor 31 is running the shifting sleeve 41 will rotate at a speed being determined by the speed of the electrical motor 31 and the gear ratio of the reduction gearing 51.

By actuation of the shifting sleeve 41 torque from the electrical motor 31 can selectively be transferred to the differential housing 11. In case no torque is transferred from the engine to the pinion 13 this enables an axle driven solely by the electric motor 31, i.e. electrical drive. On the other hand, when said pinion 13 is in fact transferring torque to the differential 10 so that mechanical all wheel drive is provided, the electrical motor 31 will add additional driving torque to the front axle.

The vehicle driveline system of FIG. 1 thus allows for selectively transfer torque for supporting a conventional drive system, may it be a front wheel drive system, a rear wheel drive system, or an all wheel drive system by enabling electrical drive without the need of several costly and space consuming components.

Figure 2:
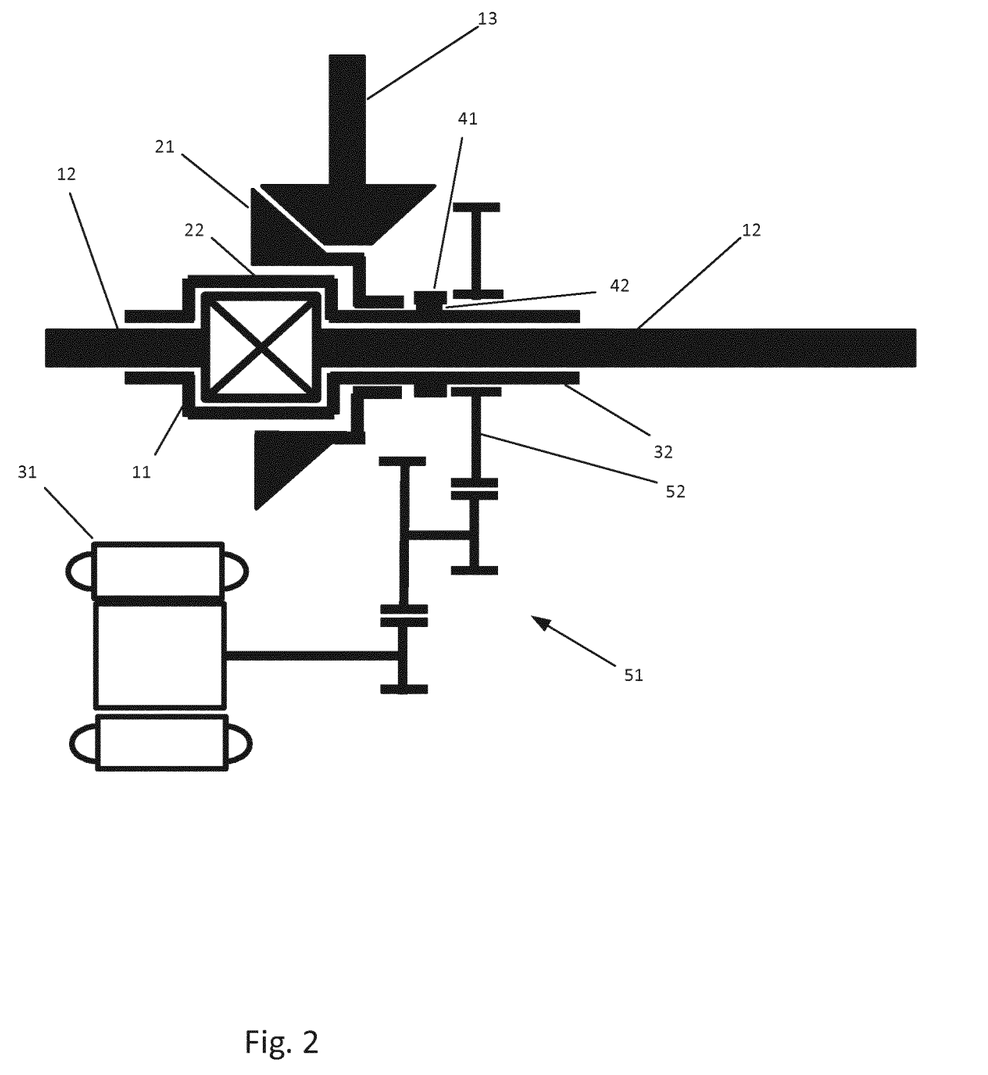
FIG. 2 is a schematic cross-sectional view of a vehicle driveline system according to an embodiment.

In FIG. 2 another embodiment of the vehicle driveline system is shown in which the differential housing 11 further comprises an outer gearing 21, being in driving connection with the pinion 13 and being selectively connectable with the hollow shaft 32 forming the driving connection with the output shafts 12. The outer gearing 21 is thus configured to mesh with the pinion 13, and to selectively connect with an inner gearing 22, forming the hollow shaft 32 being connected to the output shafts 12. The inner gearing 22 and the outer gearing 21 can connect through actuation of the shifting sleeve 41. As depicted in FIG. 2 the inner gearing 22, forming the hollow shaft 32, is provided with the radial protrusions 42.

The inner gearing 22 and the outer gearing 21 in combination with the radial protrusion 42 allows for different torque transferring modes depending on the position of the shifting sleeve 41. This is further depicted in FIGS. 3a-d.

Figure 3A:
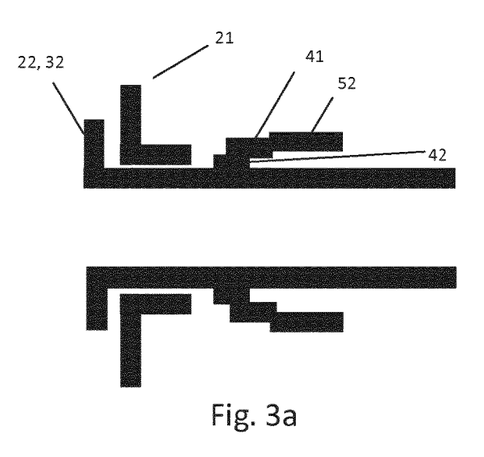
FIG. 3*a* is a schematic cross-sectional view of a shifting sleeve positioned in a first mode according to an embodiment of a vehicle driveline system.

FIG. 3a shows a first mode wherein the shifting sleeve 41 is positioned so as to connect the electrical motor 31, via the last gear 52, to the inner gearing 22 of the differential housing 11 thus effectively only transferring torque from the electrical motor 31 to the output shafts 12, i.e. achieving electric drive. In this mode the outer gearing 21, being driven by the pinion 13, is disconnected from the inner gearing 22.

Figure 3B:
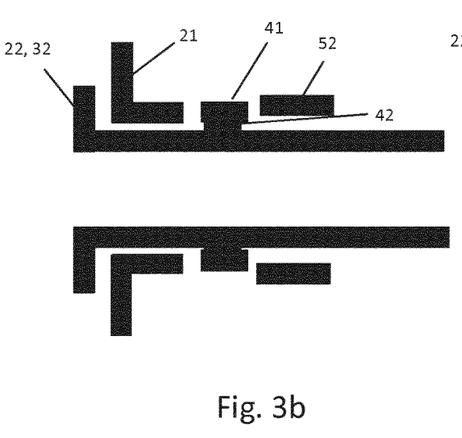
FIG. 3*b* is a schematic cross-sectional view of a shifting sleeve positioned in a second mode according to an embodiment of a vehicle driveline system.

A second mode is shown in FIG. 3b, in which the shifting sleeve 41 is disconnected from the electrical motor 31 as well as from the outer gearing 21 of the differential housing 11. The second mode can thus be described as a disconnect mode where no torque is transferred from neither the electrical motor 31 nor the pinion 13.

Figure 3C:
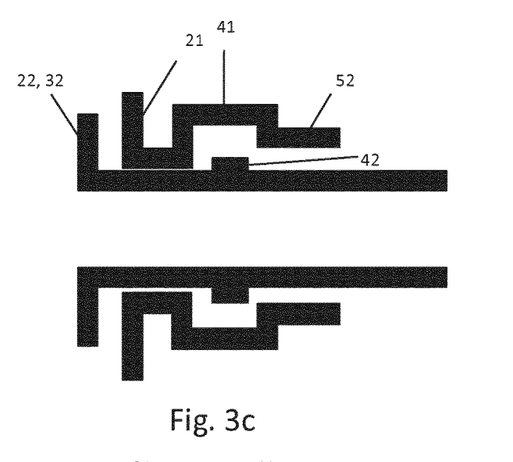
FIG. 3*c* is a schematic cross-sectional view of a shifting sleeve positioned in a third mode according to an embodiment of a vehicle driveline system.

FIG. 3c depicts a third mode wherein the shifting sleeve 41 connects the outer gearing 21 of the differential housing 11 to the electrical motor 31 while disconnecting the inner gearing 22 of the differential housing 11 from the outer gearing 21 and from the electrical motor 31. In this mode the electrical motor 31 can be controlled to accelerate the rotational speed of the pinion 13 for synchronization purposes.

Figure 3D:
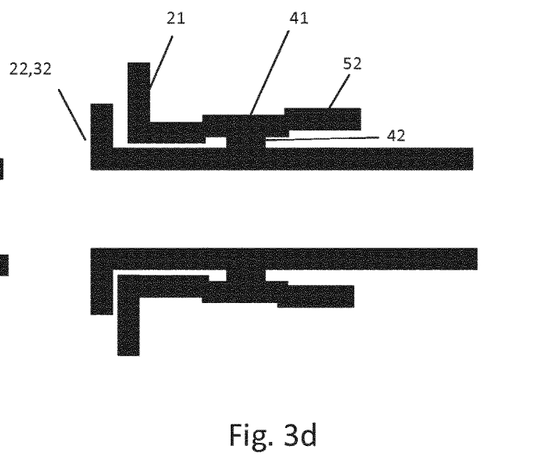
FIG. 3*d* is a schematic cross-sectional view of a shifting sleeve positioned in a fourth mode according to an embodiment of a vehicle driveline system.

A fourth mode is shown in FIG. 3d, in which the shifting sleeve 41 connects the outer gearing 21 of the differential housing 11 to the electrical motor 31 and to the inner gearing 22 of the differential housing 11. The fourth mode thus allows both the electrical motor 31 and the pinion 13, via the outer gearing 21, to transfer torque to the output shafts 12. This results in a conventional drive mode with the addition of the torque being transferred from the electrical motor 31.

Figure 4:
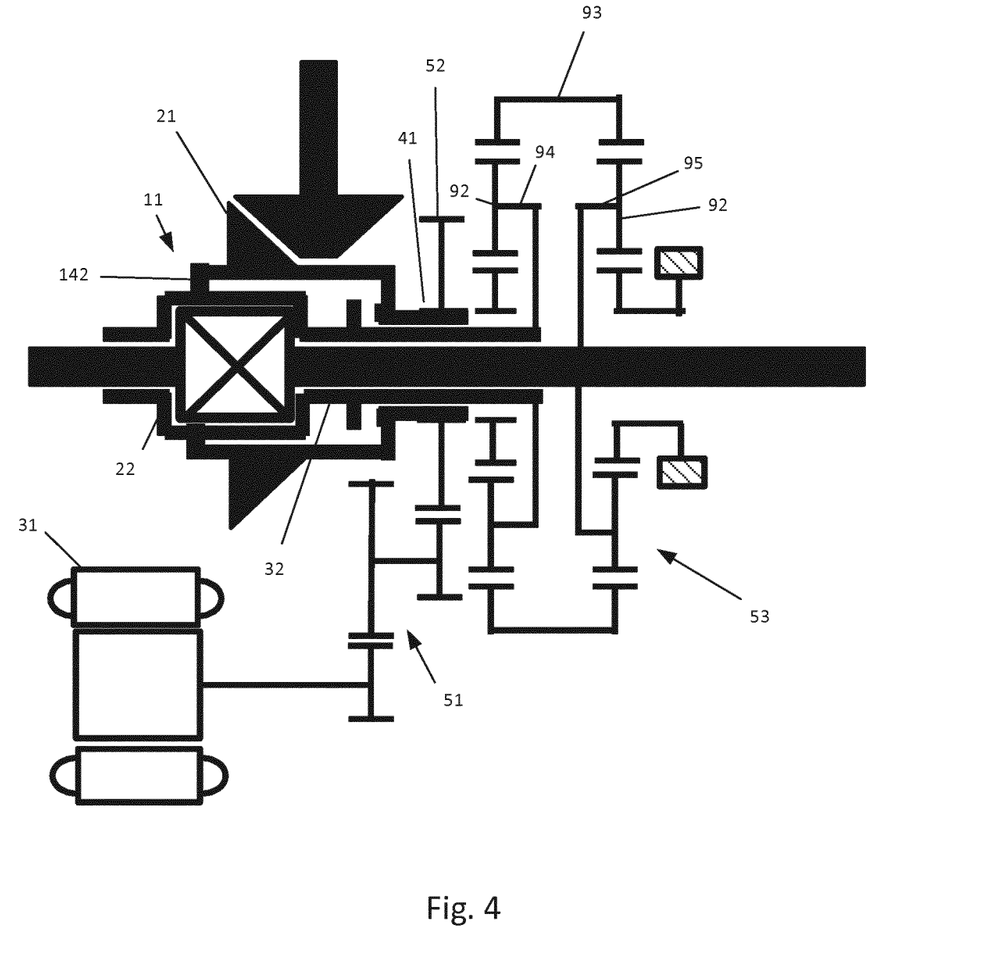
FIG. 4 is a schematic cross-sectional view of a vehicle driveline system according to an embodiment.

Yet another embodiment of a vehicle driveline system is depicted in FIG. 4. In this embodiment the electrical motor 31 is selectively connected to the differential housing 11 via a reduction gearing 51, being previously described with reference to FIGS. 1-2. Torque from the electrical motor 31 is either added to the axle or used for torque vectoring by connecting the electrical motor to the differential input as well as to one of the output shafts via a planetary gearing.

The electrical motor 31 is connected to the differential housing 11 in two selectable ways. In a first mode the shifting sleeve 41 is moved axially to the left in FIG. 4, thereby connecting the last gear 52 of the reduction gear 51 with the inner gearing 22 of the differential housing 11, either directly via the radial protrusion 42 or via the outer gearing 21 being connected to the inner gearing 22 by means of a disconnect clutch 142 being further described below.

In a second mode the shifting sleeve 41 is moved axially to the right in FIG. 4, thereby connecting the last gear 52 of the reduction gear 51 with a planetary gearing 53. The planetary gearing 53 receives input from the last gear 52 via a sun wheel, meshing with a planet carrier forming a first output shaft 94 being connected to the differential housing 11. The planetary gearing 53 also comprises a second output shaft 95 being connected to one of the output shafts 12 of the differential 10. The second output shaft 95 is formed by a second planet carrier, wherein a common ring wheel 93 meshes with the respective planet carriers 92 forming the output shafts (94, 95) of the planetary gearing 53. As can be seen in FIG. 4, a sun wheel meshing with the planet carrier 92 forming the second output shaft 95 is stationary. In this mode driving torque from the electrical motor 31 will be transferred to the differential input 11 as well as to one of the output shafts 12, thus providing torque vectoring.

As previously mentioned the vehicle driveline system may further comprise a disconnect clutch 142. The disconnect clutch 142 is configured to selectively connect the outer gearing 21 of the differential housing 11 to the inner gearing 22 of the differential housing 11. The disconnect clutch 142 can thus selectively connect the outer gearing 21 to the inner gearing 22 and the output shafts 12. Hence, mechanical all wheel drive is provided by connecting the disconnect clutch 142, and by disconnecting the electrical motor 31 from the differential 10.

According to the above mentioned embodiment depicted in FIG. 4 the shifting sleeve 41 combined the disconnect clutch 142 can be configured to be positioned in any of the modes mentioned below. These modes require the vehicle driveline system to be provided for all wheel drive vehicles, however as has been explained above the vehicle driveline system may also be arranged on front wheel drive vehicle or rear wheel drive vehicles for providing the corresponding functionality.

In a first mode the disconnect clutch 142 is not connecting the outer gearing 21 to the inner gearing 22 while the shifting sleeve 41 is connecting the last gear 52 of the reduction gearing 51 and the outer gearing 21. This allows for synchronization of the pinion 13 by accelerating the pinion 13 by means of the electrical motor 31.

In a second mode the disconnect clutch 142 is not connecting the outer gearing 21 to the inner gearing 22 while the shifting sleeve 41 is connecting the last gear 52 to the planetary gearing 53. This allows for a torque vectoring mode by controlling the electrical motor 31.

In a third mode the disconnect clutch 142 is connecting the outer gearing 21 and the inner gearing 22 while the shifting sleeve 41 is connecting the last gear 52 of the reduction gearing 51 and the planetary gearing 53. This allows for mechanical all wheel drive in combination with torque vectoring.

In a fourth mode the disconnect clutch 142 is connecting the outer gearing 21 and the inner gearing 22 while the shifting sleeve 41 is connecting the last gear 52 of the reduction gearing 51 directly to the inner gearing 22 of the differential housing 11. This allows for mechanical all wheel drive in combination with electrical all wheel drive.

In a fifth mode the disconnect clutch 142 is disconnected, while the electrical motor 31 is driving the differential housing 11 via the inner gearing 22. This allows for a purely electrical all wheel drive.

In a sixth mode the disconnect clutch 142 is disconnected, while the electrical motor 31 is disconnected from the planetary gearing 52 as well as from the inner gearing 22 of the differential housing 11. This mode thus corresponds to a neutral mode, in which the vehicle is running in two wheel drive mode.

Since the space available for a vehicle driveline system often is scarce the electrical motor 31 may be arranged radially outside the hollow shaft 32 for space saving purposes.

Figure 5:
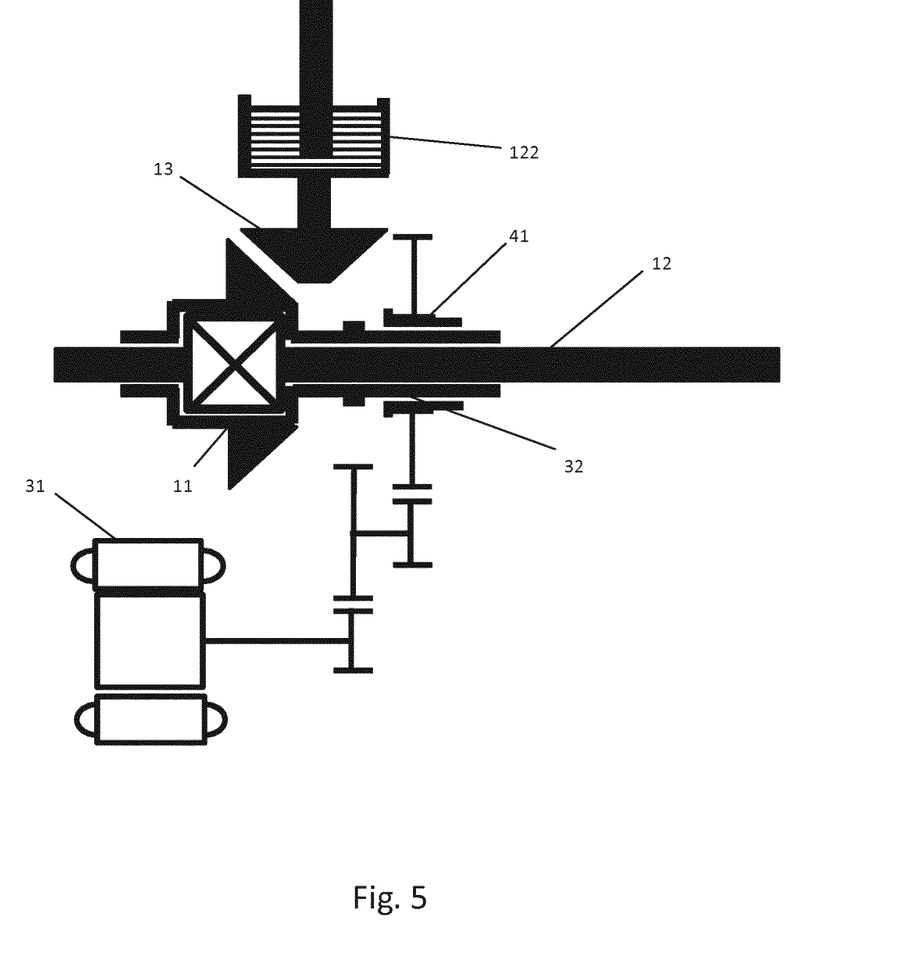
FIG. 5 is a schematic cross-sectional view of a vehicle driveline system according to an embodiment.

FIG. 5 discloses an embodiment wherein the vehicle driveline system further comprises a disc coupling 122, arranged on the input side of the pinion 13. Said disc coupling 122 is intended for transferring driving torque to the pinion 13. By actuating the disc coupling 122 a connection of the entire differential 11 in relation to the pinion 13 is achieved, thus providing mechanical four wheel drive of the vehicle.

In this embodiment the electrical motor 31 is selectively connected to the differential housing via the last gear 52 and an axially moveable shifting sleeve 41. Hence, the embodiment shown in FIG. 5 is identical to the embodiment shown in FIG. 1, except for the provision of the disc coupling 122.

Although the present invention has been described above with reference to specific embodiments, it is not intended to be limited to the specific form set forth herein. Rather, the invention is limited only by the accompanying claims.

The invention claimed is:

1. A vehicle driveline system for a vehicle, said system comprising a differential having a differential housing connectable to an engine via a pinion, and two output shafts being connectable with respective wheel axles, and an electrical motor being selectively connected to the differential housing, such that in case no torque is transferred from the engine to the pinion this enables an axle driven solely by the electric motor, and in case when said pinion is in fact transferring torque to the differential so that mechanical all wheel drive is provided, the electrical motor will add additional driving torque to the front axle, wherein the differential housing being integral with or connected to a hollow shaft having a radial protrusion provided with engagement means, such as splines, for connecting with a shifting sleeve, wherein said shifting sleeve is configured to be actuated for connecting the electrical motor to said differential housing, wherein the electrical motor is selectively connected to the differential housing via a reduction gearing such that torque from the electrical motor is either added to the axle or used for torque vectoring by connecting the electrical motor to the differential housing as well as to one of the output shafts via a planetary gearing.

2. The vehicle driveline system according to claim 1, wherein the differential housing comprises an outer gearing configured to mesh with the pinion and an inner gearing being connected with the output shafts, wherein the shifting sleeve is configured to be actuated for connecting the inner gearing to said outer gearing.

3. The vehicle driveline system according to claim 2, wherein the inner gearing forms the hollow shaft having the radial protrusion.

4. The vehicle driveline system according to claim 2, wherein the shifting sleeve is configured to be positioned in any one of the following modes: i) a first mode in which the shifting sleeve connects the electrical motor to the inner gearing of the differential housing, ii) a second mode in which the shifting sleeve is disconnected from the electrical motor and the outer gearing of the differential housing, iii) a third mode in which the shifting sleeve connects the outer gearing of the differential housing to the electrical motor while disconnecting the inner gearing of the differential housing, and iv) a fourth mode in which the shifting sleeve connects the outer gearing of the differential housing to the electrical motor and to the inner gearing of the differential housing.

5. The vehicle driveline system according to claim 1, wherein said reduction gearing comprises a gear train having a last gear being arranged coaxially around the hollow shaft of the differential housing, said last gear having means for connecting with the shifting sleeve.

6. The vehicle driveline system according to claim 1, wherein the electrical motor is arranged radially outside said hollow shaft.

7. The vehicle driveline system according to claim 1, wherein the planetary gearing has a first output shaft being connected to the differential housing (11), and a second output shaft being connected to one of the output shafts of the differential.

8. The vehicle driveline system according to claim 1, further comprising a disc coupling being arranged on an input side of the pinion for transferring driving torque to said pinion.

9. A vehicle driveline system for a vehicle, said system comprising a differential having a differential housing connectable to an engine via a pinion, and two output shafts being connectable with respective wheel axles, and an electrical motor being selectively connected to the differential housing, such that in case no torque is transferred from the engine to the pinion this enables an axle driven solely by the electric motor, and in case when said pinion is in fact transferring torque to the differential so that mechanical all wheel drive is provided, the electrical motor will add additional driving torque to the front axle, wherein the differential housing being integral with or connected to a hollow shaft having a radial protrusion provided with engagement means, such as splines, for connecting with a shifting sleeve, wherein said shifting sleeve is configured to be actuated for connecting the electrical motor to said differential housing, wherein the electrical motor is selectively connected to the differential housing via a reduction gearing such that torque from the electrical motor is either added to the axle or used for torque vectoring, wherein said electrical motor is connectable to the differential housing via a planetary gearing, wherein the planetary gearing has a first output shaft being connected to the differential housing (11), and a second output shaft being connected to one of the output shafts of the differential, wherein the output shafts of the planetary gearing are formed by a respective planet carrier, and wherein the planet carriers are meshing with a common ring wheel.

10. A vehicle driveline system for a vehicle, said system comprising a differential having a differential housing connectable to an engine via a pinion, and two output shafts being connectable with respective wheel axles, and an electrical motor being selectively connected to the differential housing, such that in case no torque is transferred from the engine to the pinion this enables an axle driven solely by the electric motor, and in case when said pinion is in fact transferring torque to the differential so that mechanical all wheel drive is provided, the electrical motor will add additional driving torque to the front axle, wherein the differential housing being integral with or connected to a hollow shaft having a radial protrusion provided with engagement means, such as splines, for connecting with a shifting sleeve, wherein said shifting sleeve is configured to be actuated for connecting the electrical motor to said differential housing, wherein the electrical motor is selectively connected to the differential housing via a reduction gearing such that torque from the electrical motor is either added to the axle or used for torque vectoring, wherein the differential housing further comprises a disconnect clutch configured to selectively connect an outer gearing of the differential housing to an inner gearing of the differential housing.

\* \* \* \* \*